3,388,094
COLORED PLASTIC COMPOSITIONS
AND COLORS THEREFOR
Chi K. Dien, Buffalo, N.Y., assignor to Allied Chemical Corporation, New York, N.Y., a corporation of New York
No Drawing. Filed Jan. 15, 1964, Ser. No. 337,749
4 Claims. (Cl. 260—41)

ABSTRACT OF THE DISCLOSURE

Colored synthetic resins containing 1,4-bis(biphenylamino)-anthraquinone which do not undergo shade alterations upon exposure to elevated temperatures, for example, up to about 700° F.

---

This invention relates to colored synthetic resins.

Synthetic resins, which include such thermoplastic polymers as polystyrene, polymethylmethacrylate, polyvinyl chloride and copolymers, polyethylene, polypropylene, fluorohydrocarbon polymers, cellulosic esters and ethers, and copolymers containing at least one of the preceding; as well as thermosetting resins such as silicones, melamine formaldehyde, melamine urea, phenol formaldehyde, comprise a large and commercially valuable class of synthetic materials. Plastic substances of this class possess the characteristic property of flowing under the at least initial application of heat and pressure and consequently have been employed in various molding processes to form a myriad of useful articles. Many of these have been colored in order to increase their utility and attractiveness. Because of the trend to the use of higher processing temperatures and pressures, organic colorants formerly suitable, i.e., capable of withstanding the processing conditions without alteration of shade or loss of other fastness properties, have proven to be unsatisfactory to meet the current demands and as a result have been eliminated from use in such resins.

In short, the conditions employed in processing synthetic resins are too drastic for most organic pigments and hence inorganic substances, such as carbon black, iron oxides, cadmium selenides, etc., have been utilized to impart colors to thermoplastic resins. However, inorganic pigments give colorations lacking in brightness and/or clarity which are desirable in many synthetic resin applications.

Furthermore, due to reactions between the organic pigment and the catalysts, antioxidants, preservatives, fungicides, vulcanizates and other special additives to the resin compositions, which reactions become increasingly important as the processing conditions are made the more severe, the list of suitable pigments has grown even smaller.

It is, therefore, an object of the present invention to provide novel compositions comprising a synthetic resin and an organic pigment which composition does not undergo shade alteration upon exposure to high temperatures, such as up to about 700° F.

In accordance with the present invention, a composition is provided containing a synthetic resin, and 1,4-bis-(biphenylamino)-anthraquinone which has the structural formula

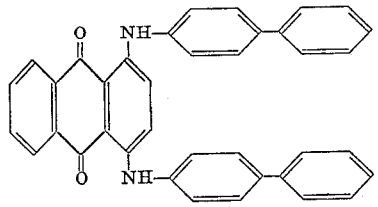

Such compositions are surprisingly stable to heat and fast to light, and they can be processed, i.e., by molding, extrusion, spinning, at high temperatures, such as up to about 700° F. without undergoing alteration in shade. Furthermore, pleasing and desirable pure green shades can be obtained, the compositions having excellent fastness characteristics against the effects of light, they have good gloss retention on weathering, etc. The pure green shade is a unique and distinguishing characteristic of these novel compositions. A commercially available green pigment of comparable heat stability and fastness characteristics gives green colorations with a decidedly blue cast; pigments which can be altered to pure green only by admixture with yellow. Obviously, such admixture is undesirable since it is always difficult to obtain a blend of colorants which can be applied without loss of one or more fastness properties. Accordingly, the pure green shades obtainable by means of the present invention have practical and economic advantages.

I am not aware of any polymeric or copolymeric resin compositions, or monomers and co-monomers, respectively, therefor in which the novel colorant of the invention could not be satisfactorily incorporated. It is conceivable, however, that there may be some compounds which may prove chemically incompatible with 1,4-bis(biphenylamino)-anthraquinone. Such situations, when they occur, can be readily recognized by the average expert in the art. Similarly, there may be some resin compositions which require molding or processing temperatures higher than would be tolerated by the pigment in the particular chemical surroundings. For the foregoing reasons, the synthetic resins which can be suitably colored by 1,4-bis(biphenylamino)-anthraquinone are those which by virtue of their chemical composition and of their usual processing temperature may be pigmented with said 1,4-bis(biphenylamino)-anthraquinone without chemical reaction or decomposition.

The incorporation of 1,4-bis(biphenylamino)-anthraquinone in the monomer, or polymer can be accomplished by known means. For example, pellets, beads or rods (the usually available commercial forms) of the polymer can be surface coated by mixing the pigment and comminuted polymer in a suitable mixer and the thus coated polymer fed to a suitable forming apparatus, e.g., a molding press, extruder or fiber spinner. Alternatively, an aqueous paste or solvent solution of the pigment can be admixed with the polymer in comminuted form, the mixture then dried (to remove water or solvent) and the dried mixture, after additional mixing if desired, for example in a ribbon mixer, fed to a molding press, etc.

A preferred mode of carrying out my invention involves preparing a mixture of 1,4-bis(biphenylamino)-anthraquinone, preferably in essentially pure and finely divided condition, and a synthetic resin in a particulate form. This mixture is tumbled in a known manner, to surface coat the polymer with pigment. The mixture is then fed to a suitable molding, extrusion or spinning apparatus or combination of such forming devices, operating at a temperature of about 600° F. The formed pigmented resin is obtained in clear, bright, pure green shades which show no evidence of shade alteration and which are fast to light.

The amount of 1,4-bis(biphenylamino)-anthraquinone which can be used to color synthetic resins can be varied over a wide range. The particular amount used is dependent upon the depth of shade or coloration desired. Thus light tints, for finished pieces, can be obtained with an amount of this unique pigment as low as 0.0001 part per 100 parts by weight of the resin composition. Deep shades, for master batches, etc., are obtainable when up to 5.0 parts or more are used per 100 parts by weight of resin composition. Master batches can be prepared by admixture of 1,4-bis(biphenylamino)-anthraquinone with the resin in the amount of about 0.5 to 5.0 parts per 100 parts by weight of resin composition, preferably from about 1.0 to 3.0 parts of pigment per 100 parts by weight of resin composition. After processing the mixture, it is comminuted and eventually mixed with unpigmented polymer. This mixture can then be processed, i.e. formed by molding, extruding or spinning, to obtain finished articles of any desired lighter pure green shade. The invention thus contemplates the use of 1,4-bis(biphenylamino)-anthraquinone in the range of extremely minute to extremely large amounts which will be limited only by the compatability of the pigment in the particular resin being colored. This maximum amount as will be evident to those skilled in this art, can vary to a considerable degree from resin to resin.

The unique green pigment, 1,4-bis(biphenylamino)-anthraquinone is a known compound and can be prepared by several known processes. For example this compound and its method of preparation from quinizarin or 1,4-dichloro-anthraquinone are disclosed in U.S. Letters Patent No. 1,960,564. The product is used preferably in a finely divided state which can be obtained in a known manner as by micropulverizing, salt grinding and the like.

The following examples describe specific embodiments of my invention and illustrate the best mode contemplated for carrying it out; but they are not to be interpreted as limiting the invention to all details of the examples. Parts and percentages are by weight and temperatures are given in degrees Fahrenheit.

Example 1

A mixture of 100 parts of polystyrene pellets and 0.05 part of 1,4-bis(biphenylamino)-anthraquinone was placed in a metal container. This was tumbled mechanically for 5 minutes to surface coat the resin with pigment. Thereafter the coated resin was fed to a laboratory extruder operating at the following temperatures:

Zone 1 _____ 375°
Zone 2 _____ 550°
Die _____ 600°

The mass was held in the extruder for 15 minutes spending about 5 minutes in each zone, before being extruded at slow speed in the form of a continuous rod ⅛ inch in diameter. The rod was colored a clear, bright pure green and showed no evidence of shade alteration. The rod was pelletized and the colored pellets were fed to an injection molding apparatus operating at about 400°. The pellets were thus formed into a plaque approximately 2" x 3" x ¼" which was exposed for 320 hours in the Fade-Ometer before any noticeable alteration in shade had occurred when compared to the unexposed sample in accordance with ASA Standard L–14.53–1961.

Example 2

The procedure of Example 1 was repeated using, instead of polystyrene, polymethylmethacrylate. The coated polymer was extruded at about 350° and molded at about 325°.

The pigmented polymer showed no alteration in shade on extrusion at about 350°. The molded plaque was exposed for 320 hours in the Fade-Ometer before any noticeable change in shade was apparent.

From the above purely illustrative examples it will be readily seen that synthetic resins containing 1,4-bis(biphenylamino)-anthraquinone as a colorant are stable to heat during the usual forming operations and the resultant compositions possess excellent fastness to light. Thus highly useful clear, bright pure green synthetic resins of excellent stability to heat and to light have been provided.

I claim:
1. A colored synethetic resin selected from the group consisting of polystyrene and polymethylmethacrylate containing 1,4-bis(biphenylamino)-anthraquinone in sufficient amount to impart color thereto.
2. The synthetic resin of claim 1, wherein said 1,4-bis(biphenylamino)-anthraquinone is present in a concentration of at least 0.0001 percent by weight of the resin.
3. The synthetic resin of claim 1, wherein said resin is polystyrene.
4. The synthetic resin of claim 1, wherein said resin is polymethylmethacrylate.

References Cited

UNITED STATES PATENTS 1,960,564   5/1934   Zahn et al. _____ 260—59
2,900,216   8/1959   Singer et al. _____ 8—59

OTHER REFERENCES

Modern Plastics Encyclopedia, September 1963 edition, pp. 398–404. Publishers: Hildreth Press, Inc. Bristol, Conn. Sci. Library, No. TP 986 A2M5.

DONALD E. CZAJA, *Primary Examiner.*

V. P. HOKE, *Assistant Examiner.*